United States Patent [19]

Hope et al.

[11] Patent Number: 4,528,736

[45] Date of Patent: Jul. 16, 1985

[54] WEATHERSTRIP INSTALLATION APPARATUS

[75] Inventors: Robert Hope, Toronto; Stephen Brown, Cambridge, both of Canada

[73] Assignee: Schlegel Canada Inc., Oakville, Canada

[21] Appl. No.: 616,663

[22] Filed: Jun. 4, 1984

[51] Int. Cl.[3] .............................................. B23P 19/02

[52] U.S. Cl. ........................................................ 29/235

[58] Field of Search ................. 29/235, 270, 278, 450; 404/87, 74; 425/458, 87; 140/109; 81/3 R, 9.1 R, 8.1 R

[56] References Cited

U.S. PATENT DOCUMENTS

| | | | |
|---|---|---|---|
| 3,359,620 | 12/1967 | Hunter | 29/235 |
| 3,488,828 | 1/1970 | Gallagher | 29/235 |
| 4,169,305 | 10/1979 | Kruszond | 29/235 |
| 4,172,313 | 10/1979 | Takahashi | 29/235 |
| 4,185,371 | 1/1980 | Burnett | 29/235 |
| 4,471,526 | 9/1984 | Zaltsberg | 29/235 |

*Primary Examiner*—Robert C. Watson
*Attorney, Agent, or Firm*—Sim & McBurney

[57] ABSTRACT

Apparatus for inserting conventional pile weatherstripping, for example, into a T-slot in an object includes a member which slides longitudinally relative to the object along the T-slot and is guided so as to remain fixed laterally with respect to the object during relative longitudinal movement. A guideway for the weatherstrip extends through the member and is inclined downwardly towards an exit adjacent the T-slot. The guideway also is angled relative to the T-slot to hold the backing of the pile weatherstrip at an angle at which one of the flanges of the backing can move into the groove of the T-slot through the T-slot opening. A finger, presser wheel or the like located upstream from the guideway exit extends into the T-slot through the T-slot opening and engages with the other of the flanges of the pile weatherstrip to move the other of the flanges into the T-slot groove through the T-slot opening.

8 Claims, 6 Drawing Figures

WEATHERSTRIP INSTALLATION APPARATUS

BACKGROUND OF THE INVENTION

This invention relates to apparatus for inserting a weatherstrip into a T-slot in an object, such as a door frame, door, window frame or window sash, for example, to be fitted with a weatherstrip.

Weatherstrip of the type comprising a backing and sealing material upstanding from the backing is well known in the art. In a popular form of such weatherstrip the sealing material is a pile strip of resilient fibers. Typical of such a weatherstrip is that shown in U.S. Pat. No. 3,175,256, issued Mar. 30, 1965, R. C. Horton, the disclosure of which is incorporated herein by reference. The weatherstrip shown in the Horton patent is sold under the trade mark "Fin-Seal" and is characterized by a barrier strip of impervious, flexible, sheet material fixed to the backing and located within the pile strip. In its more elementary form conventional weatherstrip omits the aforementioned barrier strip. In any event, generally speaking, weatherstrip to be inserted in a T-slot by apparatus embodying this invention comprises a backing and sealing material upstanding from the backing, secured to the backing and extending longitudinally of the backing at a location spaced inwardly from the side edges of the backing so as to define flanges on either side of the sealing material. Preferably the weatherstrip is of the type disclosed in U.S. patent application Ser. No. 322,155, filed Nov. 17, 1981, the disclosure of which is incorporated herein by reference, in which there is a slit or other similar line of weakness extending part way through the backing from the side thereof opposite to the side from which the sealing material extends.

Such weatherstrip normally is mounted in a T-slot in an object, such as a metal or plastic extrusion or profile, for example. The T-slot comprises a longitudinally extending groove having a longitudinally extending opening of lesser width than the width of the groove, which opening communicates with the groove. When the weatherstrip is inserted into the T-slot, the backing is located in the groove, and the sealing material protrudes through the opening with the aforementioned flanges holding the weatherstrip in the groove.

In the past weatherstrip of the type hereinbefore noted has been pulled into a T-slot by means of an endless belt carrying a clamp which is secured to a free end of the weatherstrip and which pulls the weatherstrip into the T-slot as the belt moves along parallel to the T-slot. Apparatus of this type is disclosed in U.S. Pat. No. 3,335,487, issued Aug. 15, 1957, M. H. Ellenberg et al. One disadvantage of this technique is that the force required to pull the weatherstrip into the T-slot increases as more and more of the weatherstrip is pulled into the T-slot, and the weatherstrip may snap under the high tension. Another disadvantage is that the highly tensioned weatherstrip may "shrink" after it has been fully pulled into the profile and cut. A further disadvantage of this technique is that it requires the weatherstrip to be started into the T-slot manually. In addition, pull-in apparatus of the type hereinbefore described must be somewhat longer than the profile and may not be capable of being used where the T-slot is on an inside face of the profile.

Another technique for inserting weatherstrip into a T-slot involves using a machine which simply rams the weatherstrip into the T-slot through the slot communicating with the groove. A machine to do this is relatively expensive.

SUMMARY OF THE INVENTION

In accordance with the present invention there is provided a simple and inexpensive weatherstrip insertion tool that does not unduly stress the weatherstrip as it is being inserted into a T-slot, which can be very short in length, and which may be constructed to be useful even in the situation where the T-slot may be on an inside face of a profile or the like.

An aspect of the invention is as follows:

Apparatus for inserting a weatherstrip into a T-slot in an object to be fitted with said weatherstrip; said weatherstrip being of a type comprising a backing and sealing material upstanding from said backing, secured to said backing and extending longitudinally of said backing at a location spaced inwardly from its side edges so as to define flanges on either side of said sealing material; said T-slot comprising a longitudinally extending groove having a longitudinally extending opening of lesser width than the width of said groove, which opening communicates with said groove so that when said weatherstrip is inserted into said T-slot, said backing is located in said groove and said sealing material protrudes through said opening with said flanges holding said weatherstrip in said groove; said apparatus comprising a member positionable with respect to said object such that said member and said object are movable with respect to each other in a direction along the length of said T-slot, said member including guide means cooperating with said object to inhibit lateral displacement of said member relative to said object during longitudinal relative movement thereof, said member having a guideway for receiving said weatherstrip and delivering said weatherstrip into said T-slot, said guideway being inclined downwardly toward said T-slot when said member is located above said object over said T-slot and terminating in an exit opening in the surface of said member adjacent to said object and said T-slot, said guideway also being angled relative to said T-slot to hold said backing at an angle at which one of said flanges of said backing can move into said groove through said T-slot opening via said exit opening in said member, said member further including means upstream from said exit opening extending into said T-slot through said T-slot opening and engageable with the other of said flanges for moving the other of said flanges into said groove through said T-slot opening.

DETAILED DESCRIPTION OF THE INVENTION INCLUDING THE PREFERRED EMBODIMENT

Figure 1:
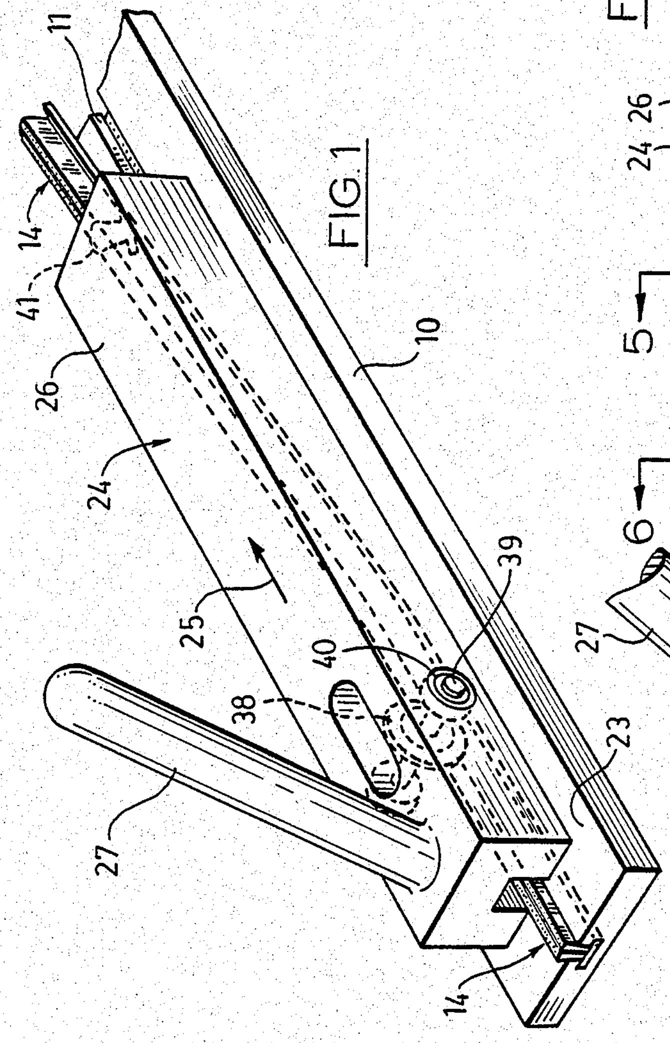
FIG. 1 is a perspective view of a weatherstrip insertion tool embodying the instant invention.

Referring to FIG. 1 there is shown an object 10, which happens to be an extrusion of rectangular cross section, that is to be fitted with a weatherstrip. A T-slot 11 is formed in object 10 and consists of a longitudinally extending groove 12 (FIGS. 4–6) having a longitudinally extending opening 13 (FIGS. 4–6) of lesser width than the width of groove 12 and centered with respect to groove 12, opening 13 communicating with groove 12 as shown.

Figure 3:
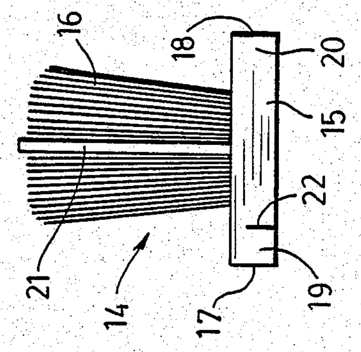
FIG. 3 is an end elevation of pile weatherstripping to be inserted into a T-slot by a weatherstrip insertion tool embodying the instant invention.
Figure 2:
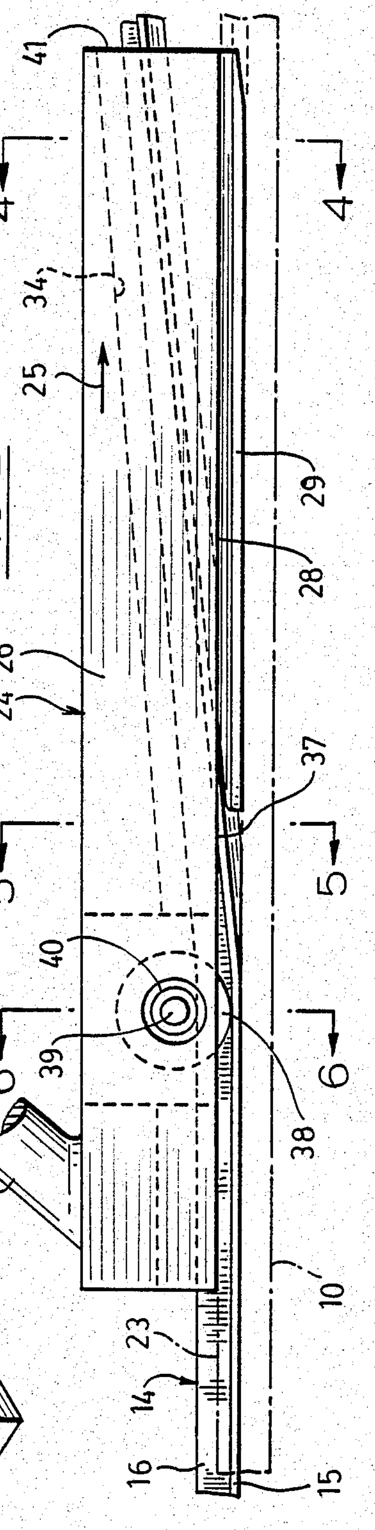
FIG. 2 is a side elevation of the weatherstrip insertion tool shown in FIG. 1.

Weatherstrip to be inserted into T-slot 11 is shown in FIG. 3 at 14 and includes a backing 15 having sealing material 16 upstanding therefrom, secured to the backing and extending longitudinally of the backing at a location spaced inwardly from its side edges 17 and 18, as a result of which backing 15 includes flanges 19 and 20 on either side of sealing material 16, which may be a pile strip of resilient fibers, as previously indicated. In the embodiment shown weatherstrip 14 also includes a barrier strip 21 of impervious, flexible, sheet material fixed to backing 15 and located within sealing material 16.

Weatherstrip 14 is illustrated as being of the type described in the aforesaid pending patent application that includes a slit 22 that happens to be located in flange 19 and which extends part way through backing 15 from the underside of backing 15, i.e., the side of backing 15 opposite to the side from which sealing material 16 extends.

Figure 6:
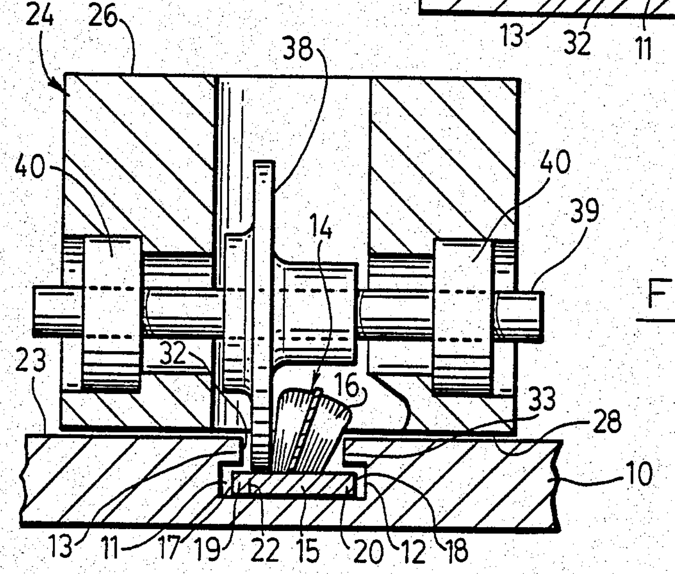

As best shown in FIG. 6, after weatherstrip 14 has been inserted into T-slot 11, backing 15 is located in groove 12 and sealing material 16 protrudes through opening 13 and above the upper surface 23 of object 10 with flanges 19 and 20 serving to hold weatherstrip 14 in T-slot 11.

As shown in FIG. 1, weatherstrip insertion apparatus 24 embodying this invention is positionable with respect to object 10 such that the apparatus, tool or member 24 and object 10 are movable with respect to each other in a direction along the length of T-slot 11. In the particular embodiment of the invention illustrated member 24 moves relative to object 10, and the direction of movement is indicated by arrow 25.

Member 24 includes what could be referred to as a slider 26 and a handgrip 27 that is secured to slider 26.

Figure 4:
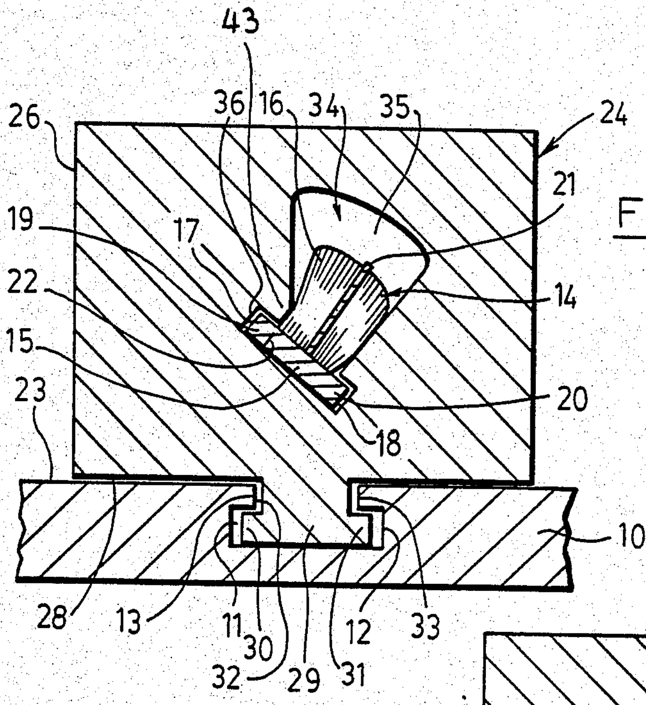
FIGS. 4 to 6 inclusive are sections taken along lines 4—4, 5—5 and 6—6 in FIG. 2.

Projecting from the underside 28 of slider 26 and a part thereof is a generally T-shaped member 29 which, as shown in FIG. 4, neatly fits into T-slot 11. The function of T-shaped member 29 is to cooperate with object 10 so as to inhibit lateral displacement of slider 26 relative to object 10 during longitudinal relative movement between member 24 and object 10. Those skilled in the art will appreciate that other forms of guide means may be employed for this purpose. T-shaped member 29 is particularly suitable, however, since, in addition, it prevents member 24 from being accidentally displaced upwardly relative to object 10 during relative longitudinal movement thereof, this being the result of flanges 30 and 31 of T-shaped member 29 being prevented by flanges 32 and 33 from lifting out of T-slot 11.

Within slider 24 a guideway 34 is provided. Preferably guideway 34 is similar in cross-sectional shape to the shape of weatherstrip 14 and thus consists of a chamber 35 in which sealing material 16 is received and a chamber 36 within which backing 15 is received.

When member 24 is in operative position with respect to member 10, as shown in FIG. 1, i.e. located above upper surface 23 of object 10 over T-slot 11, guideway 34 is inclined downwardly toward T-slot 11 and terminates in an exit opening 37 in lower surface 28 of slider 26 that is adjacent to upper surface 23 of object 10 and T-slot 11.

Figure 5:
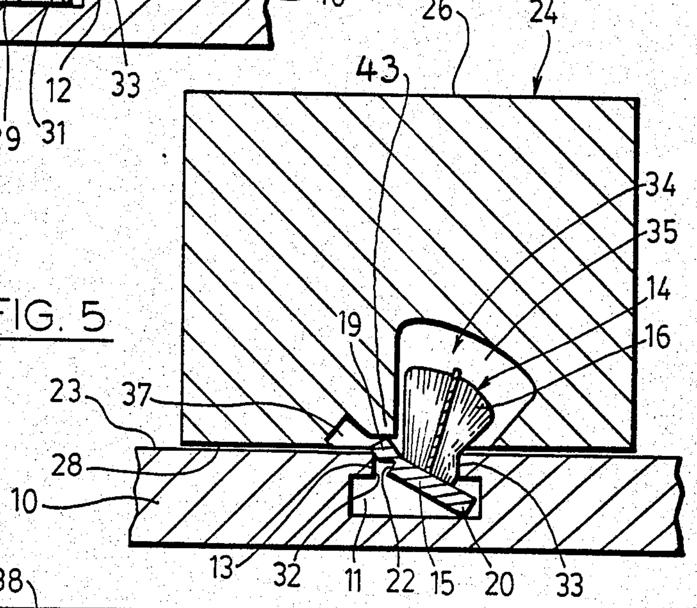

Guideway 34 also is angled relative to T-slot 11 to hold backing 15 at an angle at which flange 20 of backing 15 can move into groove 12 through opening 13 via exit opening 37, as best shown in FIG. 5.

Member 24 also includes a rotatable presser wheel 38 fixed to a shaft 39 mounted in roller bearings 40. Wheel 38 extends into T-slot 11 through opening 13 and is engageable with flange 19 of backing 15 to move flange 19 into groove 12 through opening 13, as best shown in FIG. 6. Those skilled in the art will appreciate that other means, such as a stationary finger, for example, might be employed for the same purpose as wheel 38.

In operation member 24 is mounted in juxtaposition with respect to object 10, as shown in FIG. 1, by inserting T-shaped member 29 into T-slot 11 and sliding member 24 longitudinally along object 10 parallel to T-slot 11 in the direction indicated by arrow 25. It will be noted that the entrance opening 41 to guideway 34 is downstream (relative to the direction of arrow 25) from the exit opening 37 of guideway 34 from which weatherstrip 14 emerges as it is being inserted into T-slot 11. Likewise, presser wheel 38 is located upstream from exit opening 37.

With member 34 and object 10 juxtaposed as shown in FIG. 1, weatherstrip 14 from a reel (not shown) or the like is fed into entrance opening 41 of guideway 34 and is moved down guideway 34 as shown in the sequence consisting of FIGS. 4 to 6.

As best shown in FIG. 5, the inclination of guideway 34 relative to T-slot 11 is such that backing 15 is held at an angle at which flange 20 moves into groove 12 through opening 13.

It will be noted that as weatherstrip 14 moves from the position of FIG. 4 to the position of FIG. 6, sealing material 16 moves lower and lower in chamber 35, with the result that lip 43, bearing against sealing material 16, gradually urges weatherstrip 14 downwardly and to the right, pushing flange 20 into groove 12.

Finally, presser wheel 38 contacts flange 19 opposite slit 22 forcing flange 19 also into groove 12 through opening 13, this being facilitated by bending of backing 15 at slit 22.

While movement of member 24 relative to object 10 is achieved manually in the described embodiment by gripping handgrip 27 and pulling member 24 in the direction indicated by arrow 25 while object 10 remains stationary, the operation could be mechanized, of course, and either or both of object 10 and member 24 could be moved mechanically.

In order to reduce the friction between member 24 and object 10, the lower part of the leading edge of member 24 may be replaced for a short distance, say, for ½ inch, by a suitable plastic material like Teflon (trade mark), and the two flanges 30 and 31 of T-shaped member 29 may be removed in this leading edge area to facilitate leading in of member 29 into T-slot 11.

Member 24, which generally will be fabricated of metal, e.g., tool steel GRD D2 may be coated with titanium nitride, for example, to make member 24 slide more easily on object 10 and to make it more wear resistant.

It is contemplated that it may be possible to fabricate a weatherstrip insertion tool embodying this invention from injected molded plastic, in which event the tool would be a throw-away item when worn.

Where the tool is to be employed for mounting weatherstripping in an inside slot, the location of handle 27 would be altered so that it would project from one of the sides of member 24 rather than from the upper surface thereof.

While a preferred embodiment of the invention has been described herein, those skilled in the art will appreciate that changes and modifications may be made therein without departing from the spirit and scope of the invention as defined in the appended claims.

We claim:

1. Apparatus for inserting a weatherstrip into a T-slot in an object to be fitted with said weatherstrip; said weatherstrip being of a type comprising a backing and sealing material upstanding from said backing, secured to said backing and extending longitudinally of said backing at a location spaced inwardly from its side edges so as to define flanges on either side of said sealing material; said T-slot comprising a longitudinally extending groove having a longitudinally extending opening of lesser width than the width of said groove, which opening communicates with said groove so that when said weatherstrip is inserted into said T-slot, said backing is located in said groove and said sealing material protrudes through said opening with said flanges holding said weatherstrip in said groove; said apparatus comprising a member positionable with respect to said object such that said member and said object are movable with respect to each other in a direction along the length of said T-slot, said member including guide means cooperating with said object to inhibit lateral displacement of said member relative to said object during longitudinal relative movement thereof, said member having a guideway for receiving said weatherstrip and delivering said weatherstrip into said T-slot, said guideway being inclined downwardly toward said T-slot when said member is located above said object over said T-slot and terminating in an exit opening in the surface of said member adjacent to said object and said T-slot, said guideway also being angled relative to said T-slot to hold said backing at an angle at which one of said flanges of said backing can move into said groove through said T-slot opening via said exit opening in said member, said member further including means upstream from said exit opening extending into said T-slot through said T-slot opening and engageable with the other of said flanges for moving the other of said flanges into said groove through said T-slot opening.

2. Apparatus according to claim 1 wherein said guide means is a T-shaped member that fits into said T-slot and that also inhibits said member from being pulled out of said T-slot in a direction perpendicular to the longitudinal axis of said T-slot.

3. Apparatus according to claim 1 wherein said means upstream from exit opening is a rotatable wheel.

4. Apparatus according to claim 1 wherein said guideway is formed in said member and is of substantially the same cross-sectional shape as that of said weatherstrip.

5. Apparatus according to claim 2 wherein said guideway extends through said T-shaped member.

6. Apparatus according to claim 5 wherein said means upstream from exit opening is a rotatable wheel.

7. Apparatus according to claim 6 wherein said guideway is formed in said member and is of substantially the same cross-sectional shape as that of said weatherstrip.

8. Apparatus according to claim 1 wherein said member includes a handle for moving said member longitudinally relative to said object.

* * * * *